US011188179B2

(12) United States Patent
Zheng et al.

(10) Patent No.: US 11,188,179 B2
(45) Date of Patent: Nov. 30, 2021

(54) TOUCH PANEL AND MANUFACTURING METHOD THEREOF, AND TOUCH DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Qitao Zheng, Beijing (CN); Zouming Xu, Beijing (CN); Lei Zhang, Beijing (CN); Jing Wang, Beijing (CN); Jian Tian, Beijing (CN); Xiaodong Xie, Beijing (CN); Tong Chen, Beijing (CN); Xinbin Tian, Beijing (CN); Min He, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 479 days.

(21) Appl. No.: 16/305,160

(22) PCT Filed: May 24, 2018

(86) PCT No.: PCT/CN2018/088174
§ 371 (c)(1),
(2) Date: Nov. 28, 2018

(87) PCT Pub. No.: WO2019/029226
PCT Pub. Date: Feb. 4, 2019

(65) Prior Publication Data
US 2021/0223916 A1 Jul. 22, 2021

(30) Foreign Application Priority Data

Aug. 11, 2017 (CN) .......................... 201710684332.X

(51) Int. Cl.
*G06F 3/044* (2006.01)

(52) U.S. Cl.
CPC .. *G06F 3/0446* (2019.05); *G06F 2203/04102* (2013.01); *G06F 2203/04103* (2013.01)

(58) Field of Classification Search
None
See application file for complete search history.

(56) References Cited

U.S. PATENT DOCUMENTS 9,063,628 B2    6/2015  Watazu et al.
9,405,330 B2 *  8/2016  Yamagishi ............ G06F 3/0446
(Continued)

FOREIGN PATENT DOCUMENTS

CN    105094478 A    11/2015
CN    105404408 A     3/2016
(Continued)

OTHER PUBLICATIONS

Dec. 2, 20208—(KR) Grant of Patent Appn 10-2018-7035770 with English Translation.
(Continued)

*Primary Examiner* — Duane N Taylor, Jr.

(57) ABSTRACT

A touch panel and a manufacturing method thereof, and a touch display device are provided. The touch panel includes a touch region, the touch region includes: a plurality of conductive portions arranged at intervals, a region in which the plurality of conductive portions are located including an electrode region; a plurality of electrical connection portions electrically connecting the conductive portions located in the electrode region to form a plurality of first electrodes extending in a first direction and a plurality of second electrodes extending in a second direction, the plurality of first electrodes being insulated from the plurality of second electrodes. In the second direction, each of the plurality of (Continued)

first electrodes includes at least two of the plurality of conductive portions; in the first direction, each of the plurality of second electrodes includes at least two of the plurality of conductive portions.

20 Claims, 3 Drawing Sheets

(56)  References Cited

U.S. PATENT DOCUMENTS

| | | | |
|---|---|---|---|
| 9,916,050 B2 | 3/2018 | Ikeda et al. | |
| 2012/0062250 A1* | 3/2012 | Kuo | G06F 3/041 |
| | | | 324/686 |
| 2013/0153391 A1 | 6/2013 | Liu et al. | |
| 2014/0184560 A1 | 7/2014 | Adachi | |
| 2016/0070406 A1 | 3/2016 | Han et al. | |
| 2016/0357314 A1* | 12/2016 | Liu | G02F 1/13338 |
| 2017/0153744 A1 | 6/2017 | Kang et al. | |

FOREIGN PATENT DOCUMENTS

| | | |
|---|---|---|
| CN | 205486028 U | 8/2016 |
| CN | 105929993 A | 9/2016 |
| CN | 206058170 U | 3/2017 |
| CN | 106814906 A | 6/2017 |
| GN | 106919278 A | 7/2017 |
| KR | 1020130115561 A | 10/2013 |
| TW | 201322084 A | 6/2013 |
| TW | 201324294 A | 6/2013 |
| TW | 201329811 A | 7/2013 |
| WO | 2012144643 A1 | 10/2012 |

OTHER PUBLICATIONS

Mar. 1, 20206—(CN) First Office Action Appn 201710684332.X with English Translation.

Mar. 5, 2021—(IN) Indian Office Action Appn 201847044819 with English Translation.

* cited by examiner

TOUCH PANEL AND MANUFACTURING METHOD THEREOF, AND TOUCH DISPLAY DEVICE

CROSS-REFERENCE TO RELATED APPLICATION

The application is a U.S. National Phase Entry of International Application No. PCT/CN2018/088174 filed on May 24, 2018, designating the United States of America and claiming priority to Chinese Patent Application No. 201710684332.X, filed on Aug. 11, 2017. The present application claims priority to and the benefit of the above-identified applications and the above-identified applications are incorporated by reference herein in their entirety.

TECHNICAL FIELD

At least one embodiment of the present disclosure relates to a touch panel and a manufacturing method thereof, and a touch display device.

BACKGROUND

Currently, capacitive touch technology in touch panel technology is commonly used. Usually, capacitive touch panels include self-capacitance touch panels and mutual capacitance touch panels. A self-capacitance touch panel includes an array of touch electrodes made of a transparent conductive material on a base substrate. Touch electrodes in the array of the touch electrodes respectively form a capacitor with the ground. A mutual capacitance touch panel includes horizontal electrodes and vertical electrodes which are insulated from each other and made by a transparent conductive material on a base substrate, capacitors may be formed at positions where two groups of electrodes intersect. When a finger touches the touch panel, the coupling between the two electrodes near the touch point is affected, so that the capacitance between the two electrodes is changed.

SUMMARY

At least one embodiment of the present disclosure provides a touch panel including a touch region; the touch region includes: a plurality of conductive portions arranged at intervals, a region in which the plurality of conductive portions are located including an electrode region; and a plurality of electrical connection portions electrically connecting the conductive portions located in the electrode region to form a plurality of first electrodes extending in a first direction and a plurality of second electrodes extending in a second direction, the plurality of first electrodes being insulated from the plurality of second electrodes; in the second direction, each of the plurality of first electrodes includes at least two of the plurality of conductive portions; in the first direction, each of the plurality of second electrodes includes at least two of the plurality of conductive portions.

For example, in the touch panel provided by at least one embodiment, the region in which the plurality of conductive portions are located further includes a dummy region located between the first electrode and the second electrode.

For example, in the touch panel provided by at least one embodiment, the plurality of conductive portions are uniformly distributed in the touch region.

For example, in the touch panel provided by at least one embodiment, the plurality of conductive portions in the touch region have a same planar shape and a same size.

For example, in the touch panel provided by at least one embodiment, an edge of each of the plurality of conductive portions is in a folded line shape.

For example, in the touch panel provided by at least one embodiment, a material of the plurality of conductive portions includes a transparent conductive material.

For example, in the touch panel provided by at least one embodiment, the material of the plurality of conductive portions is the same as a material of the plurality of electrical connection portions.

For example, in the touch panel provided by at least one embodiment, an extending direction of each of the plurality of electrical connection portions is neither parallel to the first direction nor parallel to the second direction.

For example, in the touch panel provided by at least one embodiment, at an intersection of the first electrode and the second electrode, the first electrode includes at least two rows of the plurality of conductive portions electrically connected and arranged in the first direction, and the second electrode includes at least two columns of the plurality of conductive portions electrically connected and arranged in the second direction.

For example, in the touch panel provided by at least one embodiment, each of the plurality of electrical connection portions and the plurality of conductive portions are arranged in different layers.

For example, in the touch panel provided by at least one embodiment, in at least one selected from the group consisting of the first electrode and the second electrode, the electrical connection portions located at an intersection of the first electrode and the second electrode are arranged in a layer different from the plurality of conductive portions, and the electrical connection portions located in a region other than the intersection of the first electrode and the second electrode are arranged in a same layer as the plurality of conductive portions.

For example, in the touch panel provided by at least one embodiment, the first direction is perpendicular to the second direction.

For example, in the touch panel provided by at least one embodiment, a planar shape of each of the plurality of conductive portions includes one selected from the group consisting of a rectangle, a triangle, a rhombus, a regular hexagon, and a circle.

For example, in the touch panel provided by at least one embodiment, a minimum distance between adjacent ones of the plurality of conductive portions is less than a maximum size of a planar shape of each of the plurality of conductive portions.

For example, in the touch panel provided by at least one embodiment, the maximum size of the planar shape of each of the plurality of conductive portions is 280 μm.

For example, in the touch panel provided by at least one embodiment, the minimum distance between adjacent ones of the plurality of conductive portions is in a range of 10-50 μm.

For example, in the touch panel provided by at least one embodiment, the touch panel is a flexible touch panel.

At least one embodiment of the present disclosure provides a manufacturing method of a touch panel including: providing a first conductive layer; forming a plurality of conductive portions arranged at intervals by patterning the first conductive layer, a region in which the plurality of conductive portions are located including an electrode region; and forming a plurality of electrical connection portions in the electrode region to electrically connect the conductive portions located in the electrode region to form a plurality of first electrodes extending in a first direction and a plurality of second electrodes extending in a second direction; the plurality of first electrodes are insulated from the plurality of second electrodes; in the second direction, each of the plurality of first electrodes includes at least two of the plurality of conductive portions, and in the first direction, each of the plurality of second electrodes includes at least two of the plurality of conductive portions.

For example, in the manufacturing method of the touch panel provided by at least one embodiment, the region in which the plurality of conductive portions are located further includes a dummy region located between the first electrode and the second electrode.

For example, in the manufacturing method of the touch panel provided by at least one embodiment, before forming the plurality of electrical connection portions, the manufacturing method further includes forming an insulation layer on the plurality of conductive portions; forming via holes in the insulation layer located in the electrode region; forming a second conductive layer on the insulation layer, the second conductive layer being electrically connected to the plurality of conductive portions through the via holes; and patterning the second conductive layer to form the plurality of electrical connection portions in the electrode region.

For example, in the manufacturing method of the touch panel provided by at least one embodiment, in at least one selected from the group consisting of the first electrode and the second electrode, the electrical connection portions located at an intersection of the first electrode and the second electrode are formed in a layer different from the plurality of conductive portions, and the electrical connection portions located in a region other than the intersection of the first electrode and the second electrode are formed in a same layer as the plurality of conductive portions.

At least one embodiment of the present disclosure provides a touch display device, including the touch panel provided by any of the abovementioned embodiments.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

Figure 1:
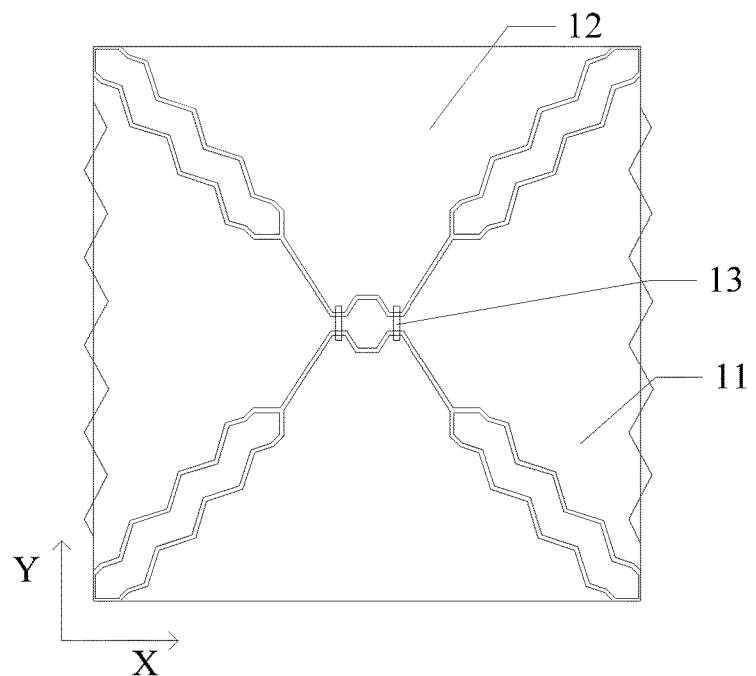
FIG. 1 is a schematic view of a pattern of a touch unit in a flexible touch panel.

FIG. 1 is a schematic view of a pattern of a touch unit in a flexible touch panel. As illustrated in FIG. 1, the touch unit includes a large-sized block-shaped first touch electrode 11 extending in an X direction and a large-sized block-shaped second touch electrode 12 extending in a Y direction. For example, one of the first touch electrode 11 and the second touch electrode 12 is a touch driving electrode, and the other of the first touch electrode 11 and the second touch electrode 12 is a touch sensing electrode. Because the first touch electrode 11 and the second touch electrode 12 are insulated from each other, a bridge connection structure 13 is provided at an intersection of the first touch electrode 11 and the second touch electrode 12 to electrically connect adjacent two blocks of the second touch electrode 12.

A flexible touch panel includes a plurality of patterns of touch units illustrated in FIG. 1; therefore, the touch panel includes a plurality of large-sized block-shaped first touch electrodes 11 extending in the X direction and a plurality of large-sized block-shaped second touch electrodes 12 extending in the Y direction. Capacitors may be formed at intersections of the plurality of first touch electrodes 11 and the plurality of second touch electrodes 12. When a finger touches the touch panel, the coupling of the capacitor near a touch point is affected, so that the capacitance of the capacitor near the touch point is changed. Thus, the change in capacitance can be utilized to determine the touch position.

In research, the inventor(s) of the present application found that: currently, in a production process of a flexible touch screen, although a glass film (GF) bridging process has a broad application prospect, the process itself has many problems to be solved. For example, in a design on a pattern of a touch unit, there is a great controversy about whether a material of a bridge point adopts a metal material or a transparent conductive material (for example, indium tin oxide, ITO). Although the ductility of a metal bridge is good, pattern-invisible effect of the metal bridge is poor. Although pattern-invisible effect of an ITO bridge is good, the ductility of the ITO bridge is poor, upon being bent, the bridge made of ITO is easy to be broken. Furthermore, in a case that the touch electrode in the touch unit adopts a larger-sized ITO pattern (for example, an ITO block having a size of 4-5 cm), the touch electrode itself would have a large internal stress, and is easily broken when being bent. Therefore, upon designing on a pattern of a touch unit, it is necessary to take pattern-invisible effect and bending endurance into account.

At least one embodiment of the present disclosure provides a touch panel and a manufacturing method thereof, and a touch display device. The touch panel includes a touch region, the touch region including a plurality of conductive portions arranged at intervals, a region in which the plurality of conductive portions are located including an electrode region; and a plurality of electrical connection portions electrically connecting the conductive portions located in the electrode region to form a plurality of first electrodes extending in a first direction and a plurality of second electrodes extending in a second direction. The first direction intersects the second direction, the plurality of first electrodes are insulated from the plurality of second electrodes. In the second direction, each of the plurality of first electrodes includes at least two of the plurality of conductive portions; in the first direction, each of the plurality of second electrodes includes at least two of the plurality of conductive portions. The touch electrodes in the touch panel provided by the embodiments of the present disclosure adopt the plurality of conductive portions arranged at intervals instead of large-sized ITO blocks, and the conductive portions located in the electrode region are electrically connected by the electrical connection portions to form the touch electrodes, thereby effectively eliminating internal stress of the touch panel and improving bending endurance of the touch panel.

Hereinafter, the touch panel, the manufacturing method thereof, and the touch display device provided by the embodiments of the present disclosure will be described with reference to the accompanying drawings.

Figure 2A:
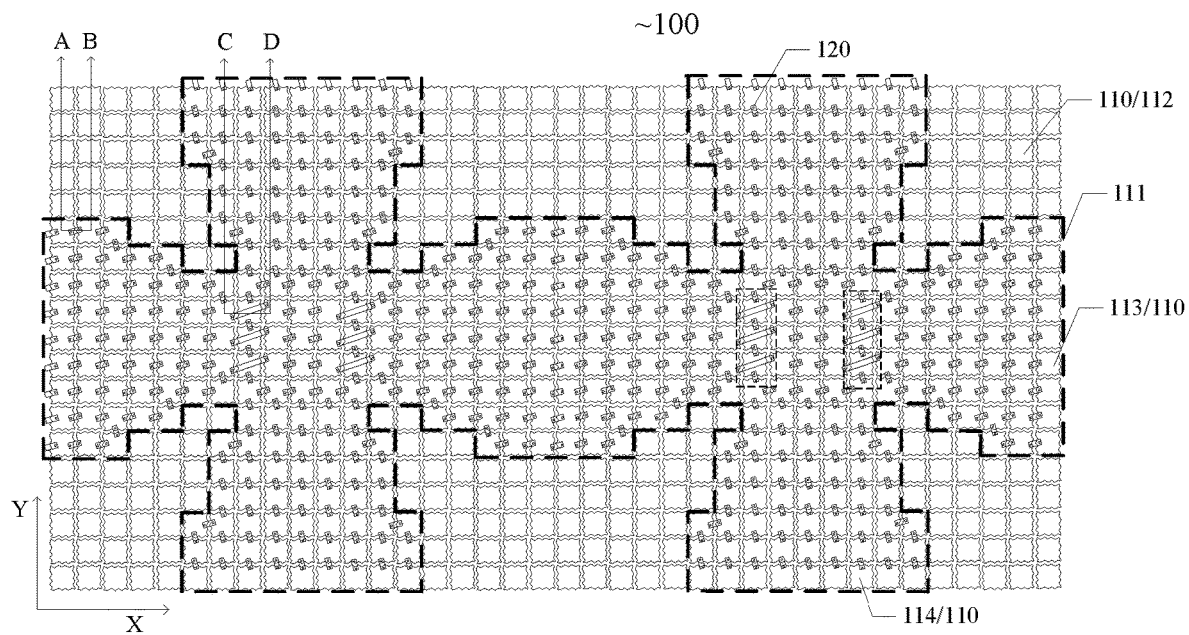
FIG. 2A is a partial planar view of a structure of a touch region in a touch panel in an embodiment of the present disclosure.

An embodiment of the present disclosure provides a touch panel. FIG. 2A is a partial schematic view of a structure of a touch region in a touch panel provided by an embodiment of the present disclosure. As illustrated in FIG. 2A, a touch region 100 includes: a plurality of conductive portions 110 arranged at intervals and arranged in an X direction and a Y direction, and a plurality of electrical connection portions 120. A region in which the plurality of conductive portions 110 are located includes an electrode region 111, and the electrode region 111 is a region defined by a dotted line in FIG. 2A. The plurality of electrical connection portions 120 are located in the electrode region 111, and electrically connect the conductive portions 110 located in the electrode region 111 to form a plurality of first electrodes 113 extending in a first direction (the X direction) and a plurality of second electrodes 114 extending in a second direction (the Y direction). The first direction is intersected with the second direction. The plurality of first electrodes 113 are insulated from the plurality of second electrodes 114. In the second direction, each of the plurality of first electrodes 113 includes at least two of the plurality of conductive portions 110, and in the first direction, each of the plurality of second electrodes 114 includes at least two of the plurality of conductive portions 110.

For example, the conductive portions 110 in each first electrode 113 (or each second electrode 114) are electrically connected with each other, and are not electrically connected with other conductive portions 110 included in other first electrodes 113 or second electrodes 114.

For example, the region in which the plurality of conductive portions 110 are located further includes a dummy region 112 located between the first electrode 113 and the second electrode 114. That is, the dummy region 112 is a region other than the region defined by the dotted line (the electrode region 111). The conductive portions 110 in the dummy region 112 are insulated from the conductive portions 110 in the electrode region 111.

In the touch panel provided by the embodiment of the present disclosure, a capacitor can be formed at an intersection of the first electrode 113 and the second electrode 114. When a finger touches the touch panel, the coupling of the capacitor near a touch point is affected, so that the capacitance of the capacitor near the touch point is changed. Thus, the change in capacitance can be utilized to determine the touch position. For example the first electrode 113 can be a driving electrode (Tx) channel, the second electrode 114 can be a sensing electrode (Rx) channel. The present embodiment is not limited thereto. The driving electrode (Tx) channel and the sensing electrode (Rx) channel can be interchanged.

In the touch panel provided by the embodiments of the present disclosure, the touch electrodes, that is, the first electrodes and the second electrodes adopt a plurality of small-sized conductive portions arranged at intervals instead of large-sized ITO blocks, and the conductive portions located in the electrode region are electrically connected by electrical connection portions to form the first electrodes and the second electrodes, thereby effectively eliminating internal stress of the touch panel and improving bending endurance of the touch panel. On the other hand, because the dummy region between the first electrode and the second electrode includes a plurality of small-sized conductive portions arranged at intervals, a mutual capacitance of the capacitor between the first electrode and the second electrode can be adjusted.

For example, as illustrated in FIG. 2A, the plurality of conductive portions 110 in the touch region 100 have the same planar shape and the same size.

For example, as illustrated in FIG. 2A, a maximum size of the planar shape of the conductive portion 110 in the present disclosure is 280 μm. That is, the present disclosure is described by taking a case that the planar shape of the conductive portion 110 is approximately square, the shape of the conductive portion 110 may be a square of 200 μm×200 μm.

For example, compared with a block-shaped second touch electrode 12 having a maximum size of 4 mm-5 mm in the X direction illustrated in FIG. 1, the touch electrode (the first electrode or the second electrode) in the present embodiment is consisted of the small-sized conductive portions 110 and the electrical connection portions 120, which can effectively eliminate the internal stress of the touch panel, and improve the bending endurance of the touch panel. A specific size of the conductive portion 110 is not limited in present embodiment, and is determined according to a size of the actual touch panel.

For example, as illustrated in FIG. 2A, a minimum distance between adjacent ones of the plurality of conductive portions 110 is less than a maximum size of the planar shape of each conductive portion 110. For example, the minimum distance between adjacent two conductive portions 110 is less than 280 μm.

For example, as illustrated in FIG. 2A, the minimum distance between adjacent two conductive portions 110 is in a range of 10-50 μm. For example, the minimum distance between adjacent two conductive portions 110 in the present disclosure can be set as 30 μm. The present disclosure includes but is not limited thereto.

For example, as illustrated in FIG. 2A, a material of the conductive portion 110 can be a transparent conductive material, such as indium tin oxide (ITO) or the like. In the present embodiment, the entire large-sized ITO touch electrode is replaced by a plurality of electrically connected small-sized conductive portions to form the touch electrode, it is considered that the difference in refractive index between the conductive portion 110 and a region where the conductive portion 110 is not provided may result in poor pattern-invisible effect of the touch panel, the plurality of conductive portions 110 provided by the present disclosure are uniformly distributed in the touch region 100. That is, a distribution density of the conductive portions 110 in the electrode region 111 is the same as that in the dummy region 112, thereby improving pattern-invisible effect of the entire touch panel.

For example, as illustrated in FIG. 2A, in the present embodiment, the conductive portions 110 in the dummy region 112 are uniformly distributed to improve the capacitance uniformity of the touch region 100.

For example, as illustrated in FIG. 2A, an edge of each conductive portion 110 is in a folded line shape. The present embodiment is described by taking a case that the conductive portion 110 is in a shape of approximately square as an example, four edges of each conductive portion 110 are designed to be in a folded line shape rather than in a general straight line shape, thereby avoiding undesired moire phenomenon to be generated upon being combined with a light source with a high-resolution such as an organic light-emitting diode (OLED) light source. It should be understood that, because the edge of the conductive portion 110 is designed to be in a folded line shape, the shape of the conductive portion 110 is "approximately square".

For example, the planar shape of the conductive portion 110 provided by the present embodiment is not limited to the square illustrated in FIG. 2A. For example, the planar shape of the conductive portion can also include one selected from the group consisting of a rectangle, a triangle, a rhombus, a regular hexagon, and a circle. For example, the edge of the conductive portion in the shape of a triangle, a rhombus, a regular hexagon, or a circle is designed as in a folded line shape rather than a smooth line or curve, thereby avoiding undesired moire phenomenon to be generated upon being combined with an OLED light source with a high-resolution.

For example, as illustrated in FIG. 2A, an extending direction of each of the plurality of electrical connection portions 120 is neither parallel to the first direction nor parallel to the second direction. For example, the first direction (the X direction) is particular to the second direction (the Y direction), and the present embodiment includes but is not limited thereto.

For example, the extending directions of the electrical connection portions 120 for electrically connecting the conductive portions 110 to form the first electrodes 113 can be the same or partially the same. Similarly, the extending directions of the electrical connection portions 120 for electrically connecting the conductive portions 110 to form the second electrodes 114 can be the same or partially the same, and the present embodiment is not limited thereto. The design in which the electrical connection portions are inclined relative to the first direction and the second direction in the present embodiment can avoid intensive arrangement of the electrical connection portions in the first direction or the second direction, so that the visual effect are not affected and human eye recognition can be avoided, thereby further improving pattern-invisible effect of the touch panel.

For example, a material of the conductive portion 110 is the same as that of the electrical connection portion 120. For example, the materials of the two are transparent conductive materials, thereby improving the electrical connection performance between the conductive portion 110 and the electrical connection portion 120.

For example, as illustrated in FIG. 2A, the first electrode 113 and the second electrode 114 each in the present embodiment can be arranged in a shape similar to a dumbbell, but the present embodiment is not limited thereto. According to the requirement on the capacitance in the actual touch panel, the first electrode 113 can be set to have equal sizes in the Y direction at any positions, and the second electrode 114 can be set to have equal sizes in the X direction at any positions.

It should be understood that, in order to clearly illustrate a planar view of a structure in the electrode region 111 and the dummy region 112 of the touch region 100, other layers other than the conductive portions 110 and the electrical connection portions 120 are not shown.

For example, FIG. 2A only schematically illustrates the distribution location of the electrical connection portions. The specific distribution location is not limited thereto, as long as the electrical connection portions can be arranged to achieve the electrical connection of the conductive portions in the electrode region to form the first electrodes and the second electrodes.

Figure 2B:
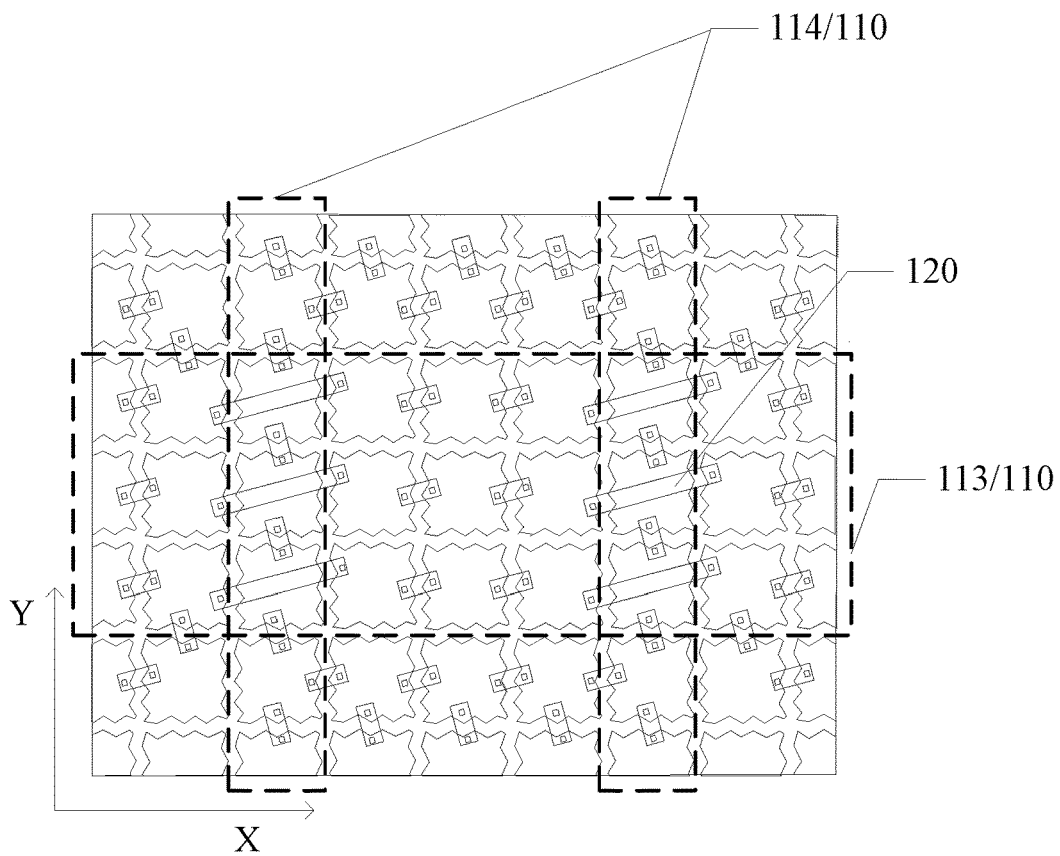
FIG. 2B is a partial planar view of a structure of an intersection of a first electrode and a second electrode illustrated in FIG. 2A.

For example, FIG. 2B is a partial planar view of a structure of an intersection of the first electrode 113 and the second electrode 114 illustrated in FIG. 2A. In the present embodiment, the narrowest position between the first electrode 113 and the second electrode 114 illustrated in FIG. 2A is taken as the intersection of the first electrode 113 and the second electrode 114. As illustrated in FIG. 2B, at the intersection of the first electrode 113 and the second electrode 114, the first electrode 113 includes at least two rows of the conductive portions 110 electrically connected and arranged in the X direction, the second electrode 114 includes at least two columns of conductive portions 110 electrically connected and arranged in the Y direction. In the present embodiment, at the intersection of the first electrode 113 and the second electrode 114, at least two rows of the conductive portions 110 electrically connected by the electrical connection portions 120 are disposed in the first electrode 113 arranged in the X direction, and at least two columns of the conductive portions 110 electrically connected by the electrical connection portions 120 are disposed in the second electrode 114 arranged in the Y direction. Upon the electrical connection portions 120 in one row/column of the electrically connected conductive portions 110 of any electrode being broken, or upon any row/column of the conductive portions 110 of any electrode being no longer in an electrical connection state, at least one row/column of the conductive portions 110 still remains in an electrical connection state to allow the overall electrode to be in an electrical connection state, thereby achieving better touch function.

For example, as illustrated in FIG. 2B, the first electrode 113 includes three rows of conductive portions 110 electrically connected and arranged in the X direction, the second electrode 114 includes two columns of the conductive portions 110 electrically connected and arranged in the Y direction, in a case that only one of the electrical connection portions 120 is broken, the touch function of the entire touch panel is not affected. The present embodiment includes but is not limited thereto. For example, the first electrode 113 may include two rows of the conductive portions 110 electrically connected and arranged in the X direction, and the second electrode 114 may include three columns of the conductive portions 110 electrically connected and arranged in the Y direction, or, the first electrode 113 and the second electrode 114 include three rows and three columns of the conductive portions 110 electrically connected, respectively.

Figure 3A:
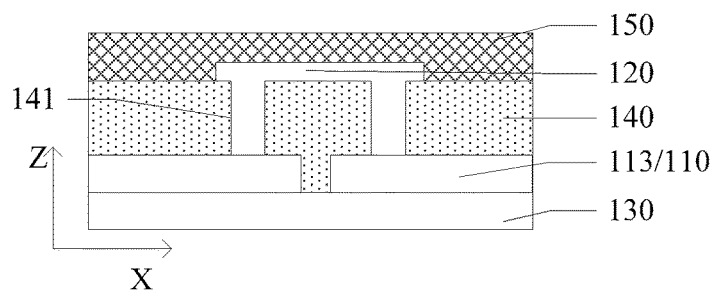
FIG. 3A is a partial sectional view in an XZ plane and taken along line AB illustrated in FIG. 2A in an example of an embodiment of the present disclosure.

For example, FIG. 3A is a partial sectional view in an XZ plane and taken along line AB in FIG. 2A in an example of an embodiment of the present disclosure. FIG. 3A illustrates the sectional view of the electrode region other than the intersection of the first electrode and the second electrode. As illustrated in FIG. 3A, the touch panel further includes a base substrate 130, the conductive portions 110 in the first electrode 113 are disposed on the base substrate 130. In an example of the present embodiment, all of the conductive portions 110 (the conductive portions 110 in the first electrode 113 and the conductive portions in the second electrode) are located in the same layer, all of the electrical connection portions 120 are located in the same layer, and the electrical connection portions 120 and the conductive portions 110 are arranged in different layers. That is, each electrical connection portion 120 and the conductive portions 110 are arranged in different layers.

For example, a first transparent insulation layer 140 is provided on a side of the conductive portion 110 away from the base substrate 130. For example, as illustrated in FIG. 3A, in the electrode region other than the intersection of the first electrode 113 and the second electrode, the first transparent insulation layer 140 is disposed on the first electrode 113 and the second electrode.

For example, as illustrated in FIG. 3A, the electrical connection portion 120 is provided on a side of the first transparent insulation layer 140 away from the base substrate 130, the electrical connection portion 120 is electrically connected with the first electrode 113 (the conductive portions 110 of the first electrode 113) through via holes 141 in the first transparent insulation layer 140 located on the first electrode 113. That is, the conductive portions 110 in the first electrode 113 are connected by a bridge point therebetween. Similarly, the electrical connection portion 120 is also electrically connected with the second electrode (the conductive portions of the second electrode) through via holes 141 in the first transparent insulation layer 140 located on the second electrode (not illustrated in the figure). In the electrode region other than the intersection of the first electrode 113 and the second electrode, the electrical connection portion 120 is usually configured to connect adjacent conductive portions 110, but the present embodiment is not limited thereto.

For example, a second transparent insulation layer 150 is further provided on a side of the electrical connection portions 120 away from the base substrate 130. For example, the first transparent insulation layer 140 and the second transparent insulation layer 150 can be optical adhesive layers, for example, a material of the optical adhesive layer can be an optically clear adhesive, which can have functions of insulation, bonding and protection. The present embodiment is not limited thereto. For example, the first transparent insulation layer 140 and the second transparent insulation layer 150 can be made of other insulation materials.

Figure 3B:
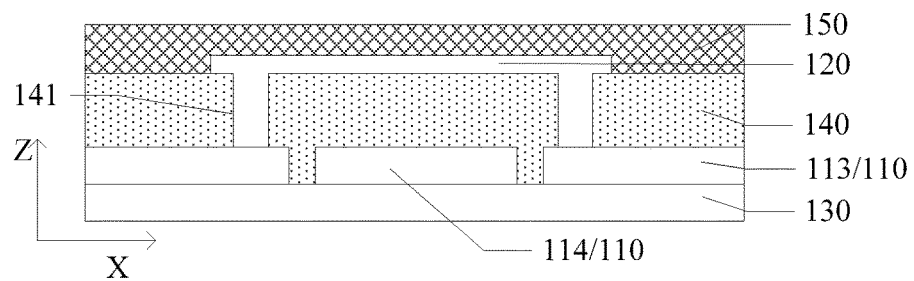
FIG. 3B is a partial sectional view in an XZ plane and taken along line CD illustrated in FIG. 2A in an example of an embodiment of the present disclosure.

For example, FIG. 3B is a partial sectional view in an XZ plane and taken along line CD in FIG. 2A in an example of an embodiment of the present disclosure. FIG. 3B illustrates a sectional view of the electrode region at the intersection of the first electrode and the second electrode. As illustrated in FIG. 3B, in the present example, each electrical connection portion 120 and the conductive portions 110 are arranged in different layers. In order to avoid a short circuit at the intersection of the first electrode 113 and the second electrode 114, although the electrical connection portions 120 for electrically connecting the first electrodes 113 and the electrical connection portions for electrically connecting the second electrodes 114 are arranged in the same layer, the electrical connection portions 120 for electrically connecting the first electrodes 113 cannot be electrically connected with the conductive portions 110 of the second electrodes 114.

For example, as illustrated in FIG. 3B, at the intersection of the first electrode 113 and the second electrode 114, the electrical connection portion 120 for electrically connecting the first electrode 113 is connected with the conductive portions 110 of the first electrode 113 through via holes 141 in the first transparent insulation layer 140 directly located on the first electrode 113. That is, the electrical connection portion 120 is the same as a general bridge point connection structure at an intersection of a driving electrode and a sensing electrode. In the extending direction of the second electrode 114 illustrated in FIG. 3B, that is, in the direction perpendicular to the XZ plane, the electrical connection portion 120 electrically connects adjacent two conductive portions to form the second electrode 114. In addition, the electrical connection portion 120 illustrated in FIG. 3B does not electrically connect adjacent two conductive portions 110 in the X direction.

In the present example, each electrical connection portion and the conductive portions are arranged in different layers. That is, the electrical connection is achieved by connecting the conductive portions through the bridge point to form the first electrode and the second electrode, which can effectively eliminate the internal stress of the touch panel and improve the bending endurance of the touch panel.

Figure 3C:
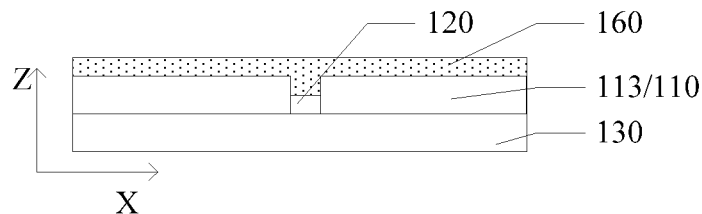
FIG. 3C is a partial sectional view of an electrode region other than an intersection of a first electrode and a second electrode in another example of an embodiment of the present disclosure.

For example, FIG. 3C is a partial sectional view of an electrode region other than an intersection of a first electrode and a second electrode in another example of an embodiment of the present disclosure. FIG. 3C illustrates a sectional view of the electrode region in another example at the same position as that of FIG. 3A. As illustrated in FIG. 3C, in a region other than the intersection of the first electrode 113 and the second electrode, each electrical connection portion 120 is arranged in the same layer as the conductive portions 110. In the region other than the intersection of the first electrode 113 and the second electrode, the conductive portions 110 and the electrical connection portion 120 are disposed on the base substrate 130, a transparent insulation layer 160 is provided on a side of the conductive portions 110 and the electrical connection portion 120 away from the base substrate 130. The transparent insulation layer 160 can be made of the same material as the first transparent insulation layer 140 in FIG. 3A.

For example, in the example illustrated in FIG. 3C, in the electrode region at the intersection of the first electrode 113 and the second electrode, the electrical connection portion 120 of at least one of the first electrode 113 and the second electrode is arranged in a layer different from the conductive portions 110 (not illustrated in FIG. 3C). For example, in the electrode region at the intersection of the first electrode 113 and the second electrode, the electrical connection portions 120 of the first electrode 113 and the second electrode are arranged in different layers from the conductive portions 110. For example, in the electrode region at the intersection of the first electrode 113 and the second electrode, the electrical connection portion 120 of one of the first electrode 113 and the second electrode is arranged in a layer different from the conductive portions 110, the electrical connection portion 120 of the other of the first electrode 113 and the second electrode is arranged in the same layer as the conductive portions 110. For example, in the example illustrated in FIG. 3C, a sectional view of a part of the electrode region at the intersection of the first electrode 113 and the second electrode is the same as the sectional view illustrated in FIG. 3B, but in the extending direction of the second electrode, that is, in the direction perpendicular to the XZ plane, the conductive portions in the second electrode and the electrical connections 120 can be located in the same layer or different layers.

Figure 4:
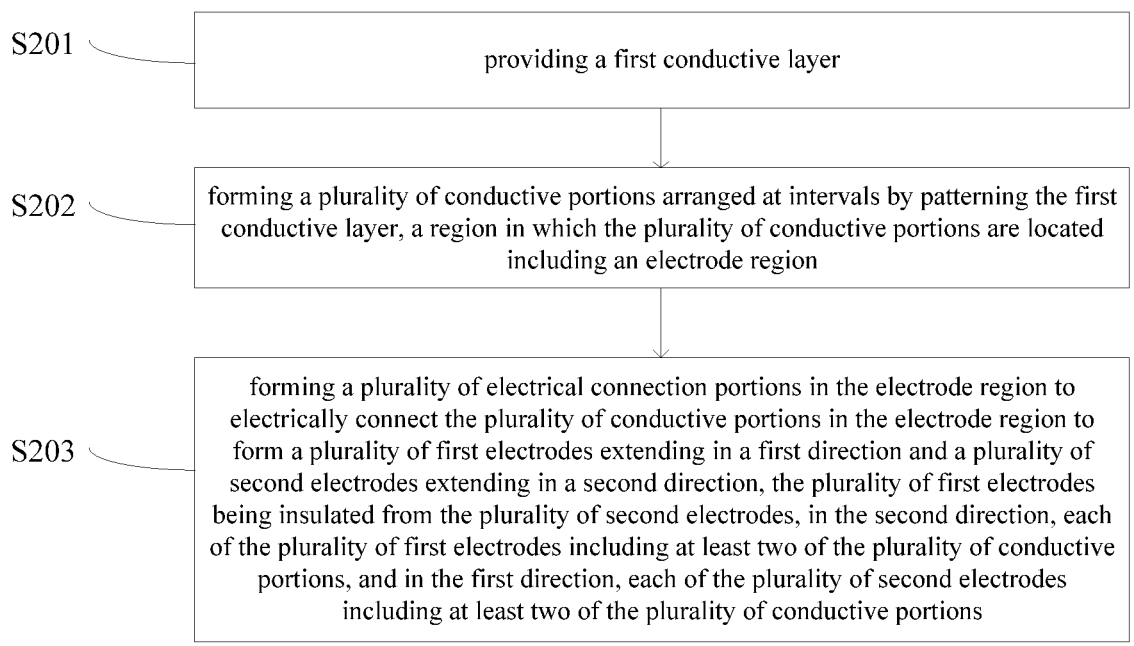
FIG. 4 is a flow chart of a manufacturing method of a touch panel provided by an embodiment of the present disclosure.

Another embodiment of the present disclosure provides a manufacturing method of a touch panel. FIG. 4 is a flow chart of the manufacturing method of the touch panel provided by an embodiment of the present disclosure, which specifically includes the following steps:

S201: providing a first conductive layer.

For example, the first conductive layer is formed on a base substrate. For example, a material of the first conductive layer can include indium tin oxide (ITO), but the present embodiment is not limited thereto.

S202: forming a plurality of conductive portions arranged at intervals by patterning the first conductive layer, a region in which the plurality of conductive portions are located including an electrode region.

For example, a photoresist layer is coated on the first conductive layer, and the photoresist layer is exposed and developed to form a photoresist pattern, and then the first conductive layer is etched by using the photoresist pattern as a mask to form the plurality of conductive portions arranged at intervals. After the conductive portions are formed, the photoresist pattern is stripped.

For example, the region in which the plurality of conductive portions are located further includes a dummy region.

For example, in an example of the present embodiment, the plurality of conductive portions formed by patterning the conductive layer are spaced apart and are not directly connected.

For example, each of the plurality of conductive portions formed in the touch region has the same planar shape and the same size.

For example, the plurality of conductive portions formed in the touch region are uniformly distributed to improve pattern-invisible effect.

For example, the conductive portions in the dummy region are insulated from the conductive portions in the electrode region.

For example, the conductive portions in the dummy region are disposed to improve the uniformity on capacitance of the touch region.

For example, an edge of each of the plurality of conductive portions is in a folded line shape, thereby avoiding the undesired moire phenomenon to be generated upon being combined with organic light-emitting diodes with a high-resolution.

For example, a planar shape of each of the plurality of conductive portions includes one selected from the group consisting of a rectangle, a triangle, a rhombus, a regular hexagon, and a circle, the present example is not limited thereto.

For example, a maximum size of a planar shape of each of the plurality of conductive portions is 280 µm, the present example is not limited thereto, and the size of the conductive portion depends on the size of the touch panel in the actual process. For example, in the present example, the planar shape of the conductive portion is approximately square, and a length of the sides of the square is 200 µm.

For example, a minimum distance between adjacent ones of the plurality of conductive portions is less than a maximum size of a planar shape of each of the plurality conductive portions.

For example, the minimum distance between adjacent ones of the plurality of conductive portions is in a range of 10-50 µm, the present embodiment is not limited thereto. For example, the minimum distance between the adjacent conductive portions is 30 µm.

For example, a metal layer is formed on the plurality of conductive portions, the metal layer is patterned to form a bonding region in a non-touch region and metal wires connecting to the bonding region. For example, the non-touch region can be a peripheral region surrounding the touch region.

S203: forming a plurality of electrical connection portions in the electrode region to electrically connect the conductive portions located in the electrode region to form a plurality of first electrodes extending in a first direction and a plurality of second electrodes extending in a second direction, the plurality of first electrodes being insulated from the plurality of second electrodes; in the second direction, each of the plurality of first electrodes including at least two of the plurality of conductive portions; and in the first direction, each of the plurality of second electrodes including at least two of the plurality of conductive portions.

For example, the dummy region is located between the first electrode and the second electrode.

For example, an insulation layer, that is, a first transparent insulation layer, is formed on a side of the plurality of conductive portions away from the base substrate. Via holes are formed in the insulation layer located in the electrode region, and the insulation layer located in the bonding region is removed to expose the bonding region by a hollowed-out processing.

For example, a second conductive layer is formed on the insulation layer and the bonding region. For example, a material of the second conductive layer can be the same as the material of the conductive portion, or can be different from the material of the conductive portion. For example, the material of the conductive portion is a transparent conductive material.

For example, the second conductive layer located in the electrode region is electrically connected with the conductive portions through the via holes. The second conductive layer is patterned to form the plurality of electrical connection portions in the electrode region. That is, each of the plurality of electrical connection portions is formed in a layer different from the conductive portions.

For example, the second conductive layer formed in the bonding region is configured to protect the metal layer in the bonding region.

For example, a material of the plurality of conductive portions is the same as that of the plurality of electrical connection portions. For example, the materials of the conductive portions and the electrical connection portions are transparent conductive materials so as to improve the electrical connection performance between the conductive portions and the electrical connection portions.

For example, an extending direction of each of the plurality of electrical connection portions is neither parallel to the first direction nor parallel to the second direction to further improve pattern-invisible effect of the touch panel.

For example, at an intersection of the first electrode and the second electrode, the first electrode includes at least two rows of the plurality of conductive portions electrically connected and arranged in the first direction, the second electrode includes at least two columns of the plurality of conductive portions electrically connected and arranged in the second direction. Therefore, at the intersection of the first electrode and the second electrode, upon the electrical connection portions in one row/column of the conductive portions of any electrode being broken, at least one row/column of the conductive portions still remains in an electrical connection state to allow the overall electrode to be in an electrical connection state, thereby achieving better touch function.

For example, in another example of the present embodiment, a part of the electrical connection portions can be formed by a patterning process at the same time during forming the conductive portions. That is, the first conductive layer can be patterned to form the electrical connection portions located in the region other than the intersection of the first electrode and the second electrode in the same layer as the conductive portions.

For example, in the present example, at the intersection of the first electrode and the second electrode, the electrical connection portions in at least one of the first electrode and the second electrode are formed in a layer different from the conductive portions. For example, the electrical connection portions of one of the first electrode and the second electrode are formed in the same layer as the conductive portions, the electrical connection portions of the other of the first electrode and the second electrode are formed in a layer different from the conductive portions. That is, the electrical connection portions of one of the first electrode and the second electrode is formed in the same layer as the conductive portions, and the conductive portions of the other of the first electrode and the second electrode are connected by the electrical connection portions formed in another layer to achieve a bridge point connection For example, in the present example, at the intersection of the first electrode and the second electrode, the electrical connection portions of the first electrode and the second electrode are formed in a layer different from the conductive portions. That is, the conductive portions in each of the first electrode and the second electrode are connected by the electrical connection portions formed in another layer to achieve a bridge point connection.

For example, the touch panel manufactured by the manufacturing method of the touch panel provided by the present embodiment can be a flexible touch panel.

In the touch panel provided by the embodiment, the touch electrodes, that is, the first electrodes and the second electrodes adopt the plurality of small-sized conductive portions arranged at intervals instead of large-sized ITO blocks, and the conductive portions located in the electrode region are electrically connected by electrical connection portions to form the first electrodes and the second electrodes, so as to eliminate internal stress of the touch panel and improve bending endurance of the touch panel. On the other hand, because the dummy region between the first electrode and the second electrode includes a plurality of small-sized conductive portions arranged at intervals, a mutual capacitance of the capacitor between the first electrode and the second electrode can be adjusted.

Another embodiment of the present disclosure provides a display device, including the touch panel provided by any of the abovementioned embodiments. The touch electrode in the touch panel adopts the plurality of small-sized conductive portions arranged at intervals instead of large-sized ITO blocks, and the conductive portions located in the electrode region are electrically connected by electrical connection portions to form the first electrodes and the second electrodes, thereby effectively eliminating internal stress of the touch panel and improving bending endurance of the touch panel.

For example, the display device can be a flexible display device. For example, the display device may be a liquid display device, an OLED display device, and any products or components having a display function and including the display device, such as: a television, a digital camera, a mobile phone, a watch, a tablet, a notebook computer, and a navigator. The present embodiment is not limited thereto.

The following statements should to be understood:

(1) Unless otherwise defined, in the embodiments and accompanying drawings in the present disclosure, the same reference numeral refers to the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or region(s) may be enlarged. However, it should be understood that, in the case in which a component or element such as a layer, film, region, substrate or the like is referred to be "on" or "under" another component or element, it may be directly on or under the another component or element or a component or element is interposed therebetween.

What have been described above are only specific implementations of the present disclosure, the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims.

What is claimed is:

1. A touch panel, comprising a touch region, the touch region comprising:
    a plurality of conductive portions arranged at intervals, a region in which the plurality of conductive portions are located comprising an electrode region; and
    a plurality of electrical connection portions electrically connecting the conductive portions located in the electrode region to form a plurality of first electrodes extending in a first direction and a plurality of second electrodes extending in a second direction, the plurality of first electrodes being insulated from the plurality of second electrodes,
    wherein in the second direction, each of the plurality of first electrodes comprises at least two of the plurality of conductive portions, and in the first direction, each of the plurality of second electrodes comprises at least two of the plurality of conductive portions.

2. The touch panel according to claim 1, wherein the region in which the plurality of conductive portions are located further comprises a dummy region located between the first electrode and the second electrode.

3. The touch panel according to claim 1, wherein the plurality of conductive portions are uniformly distributed in the touch region.

4. The touch panel according to claim 1, wherein the plurality of conductive portions in the touch region have a same planar shape and a same size.

5. The touch panel according to claim 1, wherein an edge of each of the plurality of conductive portions is in a folded line shape.

6. The touch panel according to claim 1, wherein a material of the plurality of conductive portions comprises a transparent conductive material.

7. The touch panel according to claim 6, wherein the material of the plurality of conductive portions is the same as a material of the plurality of electrical connection portions.

8. The touch panel according to claim 1, wherein an extending direction of each of the plurality of electrical connection portions is neither parallel to the first direction nor parallel to the second direction.

9. The touch panel according to claim 1, wherein at an intersection of the first electrode and the second electrode, the first electrode comprises at least two rows of the plurality of conductive portions electrically connected and arranged in the first direction, and the second electrode comprises at least two columns of the plurality of conductive portions electrically connected and arranged in the second direction.

10. The touch panel according to claim 1, wherein each of the plurality of electrical connection portions and the plurality of conductive portions are arranged in different layers.

11. The touch panel according to claim 1, wherein in at least one selected from the group consisting of the first electrode and the second electrode, the electrical connection portions located at an intersection of the first electrode and the second electrode are arranged in a layer different from the plurality of conductive portions, and the electrical connection portions located in a region other than the intersection of the first electrode and the second electrode are arranged in a same layer as the plurality of conductive portions.

12. The touch panel according to claim 1, wherein a planar shape of each of the plurality of conductive portions comprises one selected from the group consisting of a rectangle, a triangle, a rhombus, a regular hexagon, and a circle.

13. The touch panel according to claim 1, wherein a minimum distance between adjacent ones of the plurality of conductive portions is less than a maximum size of a planar shape of each of the plurality of conductive portions.

14. The touch panel according to claim 13, wherein the minimum distance between the adjacent ones of the plurality of conductive portions is in a range of 10-50 μm.

15. The touch panel according to claim 1, wherein the touch panel is a flexible touch panel.

16. A manufacturing method of a touch panel, comprising:
providing a first conductive layer;
forming a plurality of conductive portions arranged at intervals by patterning the first conductive layer, a region in which the plurality of conductive portions are located comprising an electrode region; and
forming a plurality of electrical connection portions in the electrode region to electrically connect the conductive portions located in the electrode region to form a plurality of first electrodes extending in a first direction and a plurality of second electrodes extending in a second direction, the plurality of first electrodes being insulated from the plurality of second electrodes,
wherein in the second direction, each of the plurality of first electrodes comprises at least two of the plurality of conductive portions, and in the first direction, each of the plurality of second electrodes comprises at least two of the plurality of conductive portions.

17. The manufacturing method of the touch panel according to claim 16, wherein the region in which the plurality of conductive portions are located further comprises a dummy region located between the first electrode and the second electrode.

18. The manufacturing method of the touch panel according to claim 16, wherein before forming the plurality of electrical connection portions, the manufacturing method further comprises:
forming an insulation layer on the plurality of conductive portions; forming via holes in the insulation layer located in the electrode region;
forming a second conductive layer on the insulation layer, the second conductive layer being electrically connected to the plurality of conductive portions through the via holes; and
patterning the second conductive layer to form the plurality of electrical connection portions in the electrode region.

19. The manufacturing method of the touch panel according to claim 16, wherein in at least one selected from the group consisting of the first electrode and the second electrode, the electrical connection portions located at an intersection of the first electrode and the second electrode are formed in a layer different from the plurality of conductive portions, and the electrical connection portions located in a region other than the intersection of the first electrode and the second electrode are formed in a same layer as the plurality of conductive portions.

20. A touch display device, comprising the touch panel according to claim 1.

* * * * *